Jan. 5, 1971 D. E. BERNHARDT 3,553,656
SELECTOR FOR THE DYNAMIC ASSIGNMENT OF
PRIORITY ON A PERIODIC BASIS
Filed June 3, 1969 2 Sheets-Sheet 1

INVENTOR.
DONN E. BERNHARDT

United States Patent Office 3,553,656

Patented Jan. 5, 1971

3,553,656

SELECTOR FOR THE DYNAMIC ASSIGNMENT OF PRIORITY ON A PERIODIC BASIS

Donn E. Bernhardt, Phoenix, Ariz., assignor to General Electric Company, a corporation of New York Filed June 3, 1969, Ser. No. 829,925

Int. Cl. G06f 3/04

U.S. Cl. 340—172.5 10 Claims

ABSTRACT OF THE DISCLOSURE

A data transfer system for transferring information from a plurality of user devices to a common apparatus includes means for selectively granting access to the devices on a priority basis in response to requests from the devices for transfer of the information from the user devices to the common apparatus.

BACKGROUND OF THE INVENTION

The present invention relates generally to data transfer systems and more particularly to a data transfer system including means for selectively granting priority access to one of a plurality of equipment units or user devices requesting access to a common apparatus.

Field of the invention

In on-line data processing and data communication systems various input/output data transfer transactions are normally performed involving a plurality of equipment units or external user devices which are required to communicate with a common apparatus on a time shared basis. In order to provide each of the user devices an opportunity to communicate with the common apparatus, the devices customarily provide access request output signals to a data transfer system. The data transfer system selectively honors these access requests in a predetermined manner by providing request granted signals which are used to allow each of the user devices to communicate with the common apparatus on the time shared basis.

Description of prior art

Data transfer systems generally communicate with a plurality of requesting user devices to establish a priority of one request over another request from each of the user devices. It is customary to provide an arrangement of control elements and storage cells which respond to the requests by generating request granted signals representative of the honoring of the requests from the user devices. These request granted signals are used to select one of the plurality of user devices for the transfer of data from the selected device to a common apparatus, such as a data processor memory or the like.

In one previously known data transfer system a priority selection device utilizes a pair of priority storage cells per user device in conjunction with an output control element arrangement associated with each pair. In response to an access request input signal, an output signal of a pair of highest priority storage cells is applied to the output control elements of another pair of storage cells of the next highest priority to inhibit the output signal from these cells. The output signal from the highest priority storage cell's output control element is thus providing an inhibiting effect which is propagated from one output control element to the next. This arrangement effectively provides inhibiting of the output from each pair of lower priority storage cells. However, it also requires the additional expense of a greater number of storage cells.

Still another previously known priority selection device samples the requests from a plurality of user devices for parallel entry into corresponding priority storage cells. The output signal of each storage cell is applied in parallel to output control elements associated with each of the lower priority storage cells to inhibit the selection capability of the lower priority storage cells. In this arrangement, since each output control element must receive a signal from all higher priority storage cells, the output control elements corresponding to the lower priority storage cells require a progressively greater number of input terminals. Furthermore, this arrangement imposes an additional requirement in that each priority storage cell must be capable of providing sufficient output signal power to furnish an inhibiting signal to the output control elements of each lower priority storage cell.

With an increase in the number of user devices utilized in present day data processing and data communication systems, and with the ever increasing operational speeds of these devices, it is desirable to provide a new and improved access request priority selector device for use in data transfer system which assigns priorities and grants access to a plurality of user devices in a more expeditious manner than prior art data transfer systems.

SUMMARY OF THE INVENTION

In accordance with the invention claimed, a new and improved data transfer system having a priority selector device is provided for granting access to a common apparatus and assigning priorities in response to access requests from a plurality of user devices. Information and data is transferred from the user devices to the common apparatus via the data transfer system. Granting of access requests is accomplished by simultaneously sampling or interrogating each of the access requests from the user devices on a periodic basis and dynamically assigning a higher access priority to one of the devices in a manner dependent upon the last device granted access and further dependent upon which of several devices requested access between the samplings.

The logical arrangement of the priority selector of the present invention provides a rapid method of granting access to requests in that it is unnecessary to sequentially scan each access request from the various user devices. The simultaneous sampling of access requests gives each device an equal opportunity to have access to the common apparatus and gives each device access to the common apparatus only when it requests access.

The invention may be used in a number of environments, but it finds particular use in data processing and data communication systems. In these environments, the invention provides the systems with the capability of operating with a plurality of equipment units for the transfer of information between the units and various other equipments in the systems.

In the following description of the preferred embodiment, standard logic symbols well known in the art are used. Two or more binary 1 inputs signals to an AND-gate will enable the AND-gate to provide a binary 1 signal at its output terminal. A binary 1 signal applied to any input of an OR-gate will provide a binary 1 signal at the output of the OR-gate. All bistables provide a binary 1 output signal from their 1-output terminal when they are in a first state, and a binary 0 output signal from their 1-output terminal when in a second state. The reverse is true for each bistable's 0-output terminal. An inverter will provide a binary 1 signal at its output terminal when its input signal is a binary 0, and vice versa.

It is, therefore, an object of the present invention to provide an improved priority selector device.

It is another object to provide a simplified priority selector device having a minimum number of logic elements for granting access to a plurality of user devices.

It is still another object to provide a more reliable priority selector device with high speed capability.

Another object of this invention is to provide a data transfer system having an improved high speed priority selector device for granting access to a plurality of user devices by granting access to the device on a dynamically assigned priority basis.

A further object is to provide an improved priority selector device which prevents the transfer of data to a common apparatus when no access request from a user device is present, while still remembering the last user device which had access to the common apparatus.

A still further object is to provide an improved priority selector device capable of simultaneous interrogation of access requests from a plurality of user devices.

It is a still further object to provide an improved data transfer system which assigns priorities on a sampling period basis to a plurality of user devices requesting access to a common apparatus and which allows only one of the user devices to have access to the common apparatus during a given sampling period, and which further allows one of the devices of the several user devices requesting access and having assigned to it by the data transfer system the highest priority, to have access to the common apparatus at the subsequent sampling period.

The foregoing and other objects and advantages of the present invention will become apparent as this description proceeds and the features of novelty which characterize the invention will be pointed out in particularity in the claims annexed to and forming a part of this specification.

BRIEF DESCRIPTION OF THE DRAWING

The present invention may be more readily described and understood by reference to the accompanying drawing, in which.

DESCRIPTION OF THE PREFERRED EMBODIMENT

Figure 1:
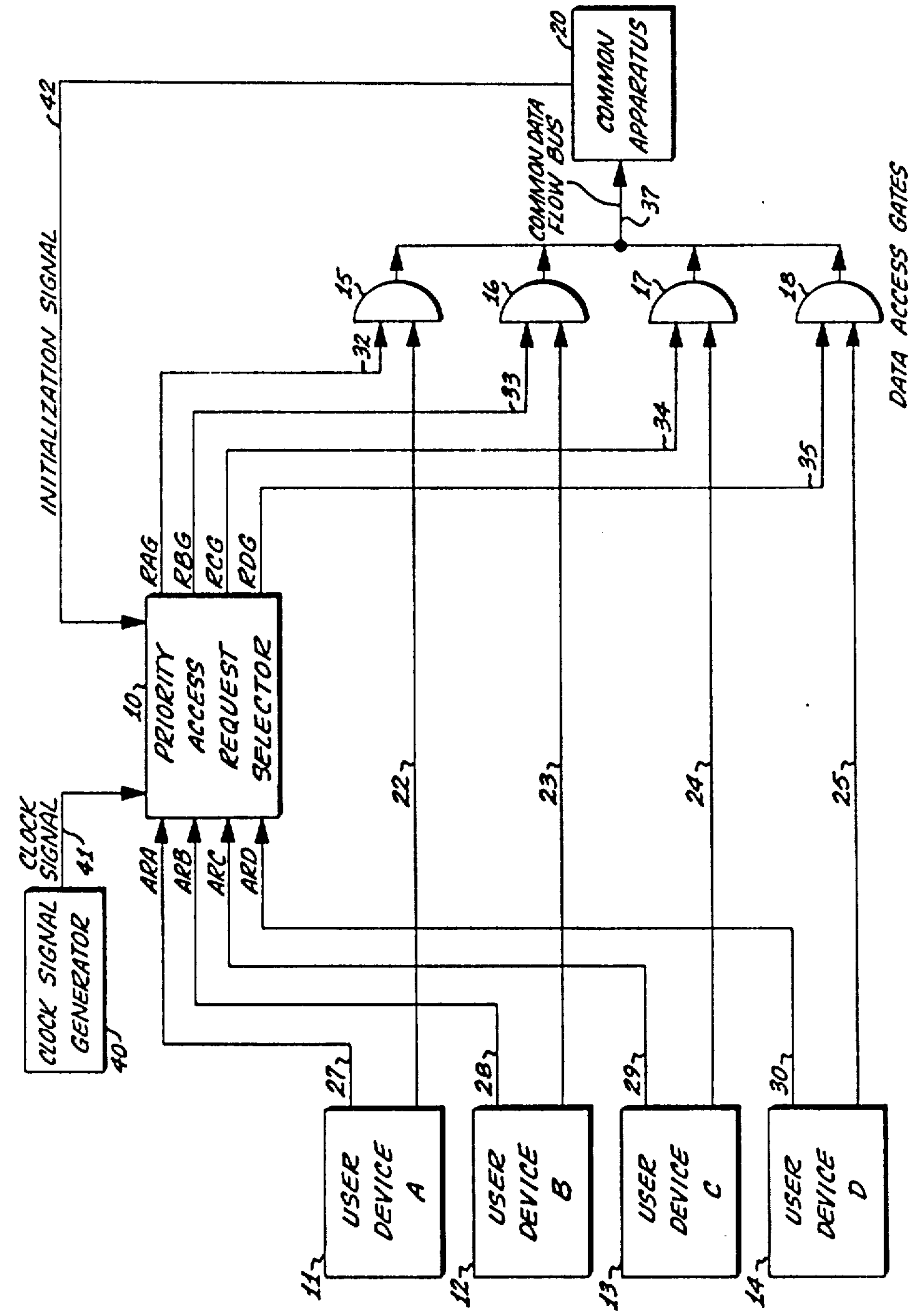
FIG. 1 is a simplified block diagram illustrating a data transfer system embodying the present invention.

Referring now to FIG. 1, there is shown a Priority Access Requet Selector 10, hereinafter referred to as the Selector. A plurality of User Devices 11–14 provide access request signals ARA–ARD to the Selector via lines 27–30 respectively. The User Devices also provide information or data over data lines 22–25 to a corresponding one of a plurality of Data Access AND-gates 15–18. The information provided by User Devices 11–14 may be transmitted to AND-gates 15–18 in either of two modes, serial or parallel. Thus, data lines 22–25 each represent either a single line for serial transmission of information signals or a plurality of lines for the parallel transfer of data.

Any one or more of the User Devices having information to be transferred over a corresponding one of the four lines 22–25 will supply an access request signal to the Selector. The Selector 10 will individually acknowledge the presence of the access request signals ARA–ARD by providing separate Request Granted signals RAG–RDG to the Data Access Gates 15–18. These signals RAG–RDG are supplied to Gates 15–18 over lines 32–35 respectively. For example, the acknowledgment by the Selector of signal ARA from User Device 11 will cause signal RAG to enable Data Access Gate 15, for the transfer of information from User Device 11 to Common Apparatus 20 via Common Data Flow Bus 37.

In the operation of the Selector 10, only one of the signals RAG–RDG is applied to a corresponding one of the Data Access Gates 15–18 during a data transfer period; thus, the data being transferred over Common Data Flow Bus 37 via one of the AND-gates 15–18 will be the data selected by one of the RAG–RDG signals applied to one of the AND-gates 15–18 corresponding to the User Device being granted access to the Common Apparatus 20.

The information transferred over Common Data Flow Bus 37 to Common Apparatus 20 could be, for example, information to be store in a memory such as a computer working store. However, the Common Apparatus 20 could represent any one of several types of apparatus designed for receiving either serial or parallel information from the user Devices 11–14.

In FIG. 1 there is shown as an input to Selector 10 a Clock Signal on line 41 from a Clock Signal Generator 40. The Clock Signal on line 41 is applied as an interrogation signal or sampling pulse to the Selector at repetitive time intervals for controlling the time of granting the User Devices priority access to the Common Apparatus 20.

Also shown in FIG. 1, an Initialization Signal or Pulse is applied to the Selector 10 via line 42, which is connected from the Common Apparatus 20 to the Selector. The Initialization Signal on line 42 is utilized by the Selector 10 as a means to initially establish a specified pattern for the Selector for subsequent honoring of access request signals ARA–ARD from User Devices 11–14.

Figure 2:
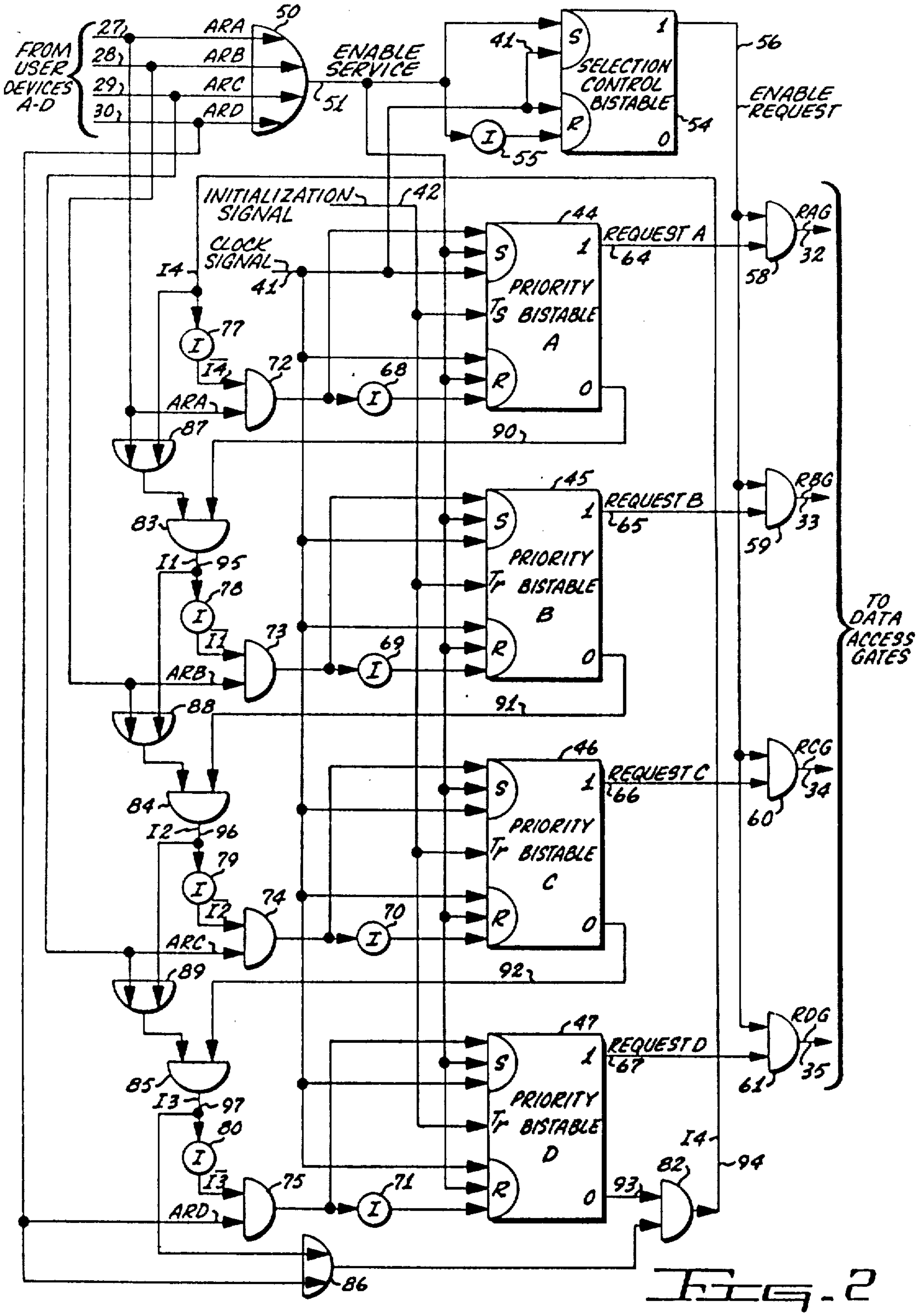
FIG. 2 is a logic schematic of the Priority Access Request Selector shown in FIG. 1.

Referring now to FIG. 2, there is shown a logic schematic of the Selector 10 of FIG. 1. The Selector 10 is comprised of a plurality of Priority Bistables A–D, often referred to as "Flip Flops," designated by the numerals 44–47. Bistables 44–47 serve as temporary storage cells for control signals representative of the access request signals ARA–ARD supplied to the Selector 10 from the User Devices 11–14. Each of the Bistables 44–47 is associated with a corresponding one of the User Devices 11–14 of FIG. 1. The Bistables each respectively receive an access request input signal from its associated User Device on one of the lines 27–30 via AND-gates 72–75, and inverters 68–71. Each of the Bistables 44–47 is provided with an AND-gate reset (R) input and an AND-gate set (S) input. In addition, an Initialization Signal on line 42 supplied by the Common Apparatus 20 (FIG. 1) is applied simultaneously to a *Ts* (Trigger set) input of Bistable 44 and to a *Tr* (trigger reset) input of each of the Bistables 45–47 to initially establish a priority pattern for the Selector 10 for subsequent honoring of access request signals from the User Devices 11–14. These *Ts* and *Tr* inputs function independently from the S and R AND-gates of the Bistables. That is, upon the application of the Initialization Pulse on line 42 to the Bisables 44–47, Bisable A (44) is placed in a first state (set state), whereas Bistables B–D (45–47) are each placed in a second state (reset state). It can readily be seen that any one of the Bistables could be placed in a first state, and all of the others could be placed in the second state in the same manner as just described, merely by rearranging the connections of the initialization means to the *Ts* and *Tr* inputs of the Bistables.

The access request signal lines 27–30 of FIG. 2 are all connected as inputs to an OR-gate 50, which provides at its output a binary 1 Enable Service Signal on line 51 whenever any of the input signals ARA–ARD from one of the User Devices 11–14 is a binary 1. This enable Service Signal on line 51 is applied simultaneously to the S and R AND-gates of the Bistables 44–47. Thus, when any of the ARA–ARD signals is applying a binary 1 signal to OR-gate 50, a binary 1 Enable Service Signal is applied via line 51 to the S and R AND-gates of the Bistables 44–47. This Enable Service Signal from OR-gate 50 provides a means to condition the S and R AND-gates of each of the Bistables so that they may change their states in accordance with the conditions of the ARA–ARD signals applied to the Selector 10. Whenever the Enable Service Signal on line 51 is a binary 0, none of the Bistables 44–47 can change state even though the other inputs to the S and R AND-gates are binary 1's, since the signal on line 51 will disable each of these AND-gates.

This will occur when none of the User Devices 11–14 are requesting access to the Selector 10.

The Enable Service Signal on line 51, in addition to providing a set and reset control function for Bistables 44–47, is also applied to a Selection Control Bistable 54 which has S and R AND-gate inputs similar to Bistables 44–47. Whenever the Enable Service Signal on line 51 is a binary 1, the S AND-gate of Control Bistable 54 is conditioned so that the Bistable will establish a set state upon application thereto of a Clock Signal on line 41. In a similar fashion, when the output of OR-gate 50 is a binary 0, the S AND-gate of Control Bistable 54 is disabled. However, the binary 0 signal is inverted to a binary 1 by Inverter 55. This binary 1 signal is applied to the R AND-gate of Control Bistable 54 to condition the R AND-gate so that Bistable 54 will achieve a reset state when the Clock Signal on line 41 is applied to the R AND-gate.

As shown in FIG. 2, when Control Bistable 54 is in a set state, its 1-output terminal will provide a binary 1 Enable Request Signal via line 56 to each of four AND-gates 58–61. Each of the AND-gates 58–61 has as an additional input, a line connected from the 1 output terminal of the Priority Bistable associated therewith. These lines are identified by reference characters 64–67 and they provide signals Request A-Request D respectively to AND-gates 58–61. Whenever one of the Bistables 44–47 is in a set state, its 1-output terminal will apply a binary 1 signal to its assoicated AND-gate via a request line connected therebetween to enable the AND-gate when the Enable Request Signal on line 56 is a binary 1.

Referring now to the Bistables 44–47 of FIG. 2, each of the Bistables is provided with a similar input logic structure utilized as an input control means for controlling the establishment of the states of the Bistables. Each of the Bistables 44–47 has assoicated with it an input inverter identified respectively by reference characters 68–71. It is common practice in the art to utilize inverters in the manner shown in order to control the input signal to the set and reset input terminals of a bistable to enable the bistable to achieve either a set or a reset state upon the application thereto of a clock Signal. Each of the Inverters 68–71 receives an input from a corresponding one of four AND-gates 72–75. Each of the AND-gates 72–75 has applied thereto, as one input, one of the ARA-ARD signals from a User Device associated therewith. In addition, each of the AND-gates 72–75 has as a second input an inhibit signal from an inverter. AND-gate 72 receives an input signal $\overline{I4}$ from Inverter 77, and each of the AND-gates 73–75 has as an input one of the signals $\overline{I1}$–$\overline{I3}$ from their respectively associated Inverters 178–180. These $\overline{I1}$–$\overline{I4}$ signals perform an inhibit control function to control the output signal of each of the AND-gates 72–75, which in turn provide the proper set and reset input signals to the S and R AND-gates of Bistables 44–47. The Inverters 77–80 each receive an input signal from a corresponding AND-gate. Inverters 178–180 respectively receive input signals I1–I3 from AND-gates 83–85, and Inverter 77 has an input signal I4 from AND-gate 82.

Each of the Bistables 44–47 also has associated with it an OR-gate respectively identified by reference characters 86–89. The OR-gates each have connected thereto, as one input, a corresponding one of the signals ARA-ARD on lines 27–30 from User Devices 11–14. As a second input, each of the OR-gates 86–89 receives a signal from a corresponding AND-gate as follows: OR-gate 87 receives a signal I4 from AND-gate 82, OR-gate 88 has applied thereto a signal I1 from AND-gate 83, OR-gate 89 has an input signal I2 from AND-gate 84, and signal I3 is applied to OR-gate 86 from AND-gate 85. The output of each of the OR-gates 86–89 is connected, respectively, as one input to a corresponding one of AND-gates 82–85. Each of the AND-gates 82–85 also has connected thereto a second input from the 0-output terminal of one of the Bistables 44–47 associated therewith. These latter inputs to Gates 82–85 are supplied via lines 90–93.

In the preferred embodiment, the establishment of an initial priority pattern for the Bistables 44–47, shown in FIG. 2, is performed to initialize the Selector 10 for the subsequent honoring of access requests from User Devices 11–14. This initialization process is accomplished by the application of an Initialization Signal on line 42 to the Selector 10 from the Common Apparatus 20 (FIG. 1). In the present explanation, for purposes of expediency and simplicity, it is assumed that the Initialization Signal is a binary 1 pulse momentarily applied at initialization satrt up of the system such as when power is first turned on. Referring further to FIG. 2, the Initialization Signal on line 42 is applied simultaneously to a *Ts* input of Bistable 44 and to a *Tr* input of each of the Bistables 45–47; thus placing Bistable 44 in a set state and each of the Bistables 45–47 in a reset state to establish the initial priority pattern for the Bistables.

With the establishment of the initial priority pattern, the 1-output terminal of Bistable 44 provides a binary 1 output signal, Request A, to an AND-gate 58 via line 64. Signals Request B-Request D, respectively associated with the 1-output terminal of Bistables 45–47, each supply a binary 0 signal to AND-gates 59–61. If it is assumed at this time that none of the User Devices 11–14 (FIG. 1) is providing an access request on lines 27–30 to OR-gate 50, the Enable Service Signal on line 51 is a binary 0. Thus, Bistable 54 will be in a reset state due to the application of the Clock Signal on line 41 applied to the R AND-gate of Bistable 54 in conjunction with the output of Inverter 55 which is a binary 1. It will be noted that with Bistable 54 in a reset state, the Enable Request Signal on line 56 connected to the 1-output terminal of Bistable 54 is a binary 0, thus disabling each of the AND-gates 58–61.

It is significant to note with the condition just established, that is, with none of the User Devices 11–14 requesting access to the Selector 10, and further due to the arrangement of the logic elements and the Bistables within the Selector, that the states of the Bistables 44–47 and 54 will not change upon application thereto of the Clock Signal on line 41. This is controlled by the Enable Service Signal on line 51, which, as previously explained, is applied to the S and R AND-gates of each of the Bistables 44–47 and 54. Therefore, the priority pattern manifested by the states of the Bistables will remain static until one or more of the User Devices 12–14 request access to the Selector 10.

Still referencing FIG. 2, it can be seen that the logic elements associated with each of the Bistables 44–47 provide logic structures which are connected in a circular path or closed loop configuration to provide a logic network or structure having a unidirectional path for propagating signals to travel therethrough. The logic network provides a control means which allows a signal representative of an access request to propagate through the loop or chain of logic elements and stopping at a given point in the loop. This is explained by considering the operation of the Selector 10 first in various static states with certain established conditions and then considering the dynamic operation of the Selector using these established static conditions as an explanatory base from which to start. A typical static state of the Selector logic is depicted in the following example:

Assume a static condition of the logic wherein Bistable 45 is in a set state, Bistables 44, 46, 47 and 54 are each in a reset state, and none of the User Devices 11–14 is providing an access signal to the Selector on lines 27–30 (ARA–ARD are binary 0's). Under this condition AND-gates 58–61 are disabled by the binary 0 Enable Request Signal from the 1-output terminal of Bistable 54. AND-gate 84 is also disabled by the application of a binary 0 signal from the 0-output terminal of Bistable 45 via line line 91. Further, since each of the Bistables 44, 46 and 47 are reset, the signal at the 0-output terminal of each Bistable is a binary 1. The binary 1 signal from each of the Bistables 44, 46 and 47 is applied as one input to a corresponding one of the AND-gates 83, 85 and 86, via lines 90, 92 and 93. Thus, each of the AND-gates 83, 85 and 86 is conditioned so that it may be enabled by the subsequent application thereto of a binary 1 signal to a second input. Since AND-gate 84 is disabled, its output on line 96 will supply a binary 0 signal I2 to OR-gate 89. The output of OR-gate 89 will also be a binary 0 because the ARC signal on line 29 is a binary 0. Thus, the binary 0 from OR-gate 89 will disable AND-gate 85, which will in turn apply a binary 0 signal I3 to OR-gate 86. OR-gate 86 will similarly provide a binary 0 output signal to disable AND-gate 82 since the ARD signal on line 30 applied to OR-gate 86 is a binary 0. With AND-gate 82 disabled, it will apply a binary 0 signal I4, via line 94, to Inverter 77 and OR-gate 87, the latter also receiving a binary 0 signal ARA on line 27.

Referring now to OR-gate 50 of FIG. 2, it receives, as inputs, each of the signals ARA–ARD on lines 27–30, respectively. Recalling that each of these signals is a binary 0, the output Enable Service Signal or OR-gate 50 is a binary 0 which is applied as a binary 1 to the R AND-gate of Bistable 54 from Inverter 55. The Enable Service Signal is also applied to the S AND-gate of Bistable 54 and to the S and R AND-gates of Bistables 44–47 via line 51, disabling each of the respective S and R AND-gates. This prevents Bistables 44–47 and 54 from changing states until an access request signal (binary 1) is present at the input of OR-gate 50.

It will be recalled from the previous discussion of the operation of the Selector 10, under a static condition, the following conditions prevail:

(1) Bistable 45 is in a set state.

(2) Bistables 44, 46, 47 and 54 are each in a reset state.

(3) None of the User Devices is requesting access to the Selector via lines 27–30 (each of the inputs ARA–ARD is a binary 0).

(4) AND-gates 58–61 are disabled by the Enable Request binary 0 signal from Bistable 54 on line 56.

In the dynamic operation of the Selector 10, consider the conditions just set forth to be existent at the time the following occurs:

Between two consecutive Clock Signals, User Device 13 (FIG. 1), requests access to the Selector 10 by the application of a binary 1 signal ARC on line 29 to AND-gate 74, and to OR-gates 50 and 89. The binary 1 signal ARC is passed through OR-gate 89 where it is applied to AND-gate 85. AND-gate 85 is enabled by the ARC signal since it is receiving a binary 1 input signal via line 92 from the 0-output terminal of Bistable 46. The output signal I3 (binary 1) from AND-gate 85 is applied to OR-gate 86. In a similar fashion, as just described for OR-gate 89 and AND-gate 85, the ARC signal is successively propagated through OR-gate 86 and AND-gate 82 via line 94 (I4), to the input of OR-gate 87. In a like manner, the ARC signal is passed through OR-gate 87, AND-gate 83, and through OR-gate 88, to the input of AND-gate 84. Since Bistable 45 is in a set state, a binary 0 signal is being applied to AND-gate 84 via line 91. This binary 0 signal disables AND-gate 84, thus inhibiting further propagation of the ARC signal through the logic element configuration. The significance of this inhibition action will be more fully explained in the subsequent discussions.

As a further example, consider the conditions established during the initialization phase; i.e., Control Bistable 54 is in a reset state. Bistable 44 is in a set state and Bistables 45–47 are each in a reset state. In addition, assume that the ARA signal on line 27 from User Device 11 becomes active (binary 1). The ARA signal is simultaneously applied to AND-gate 72 and to OR-gates 50 and 87. Signal ARA will activate OR-gate 50, which in turn will cause the Enable Service Signal on line 51 to apply a binary 1 input to each of the S and R AND-gates of Bistables 44–47 and to the S AND-gate of Bistable 54, thus activating one input of each of the AND-gates. Further assuming at this time that none of the other User Devices 12–14 is requesting access on lines 28–30, the ARB–ARD inputs to the respective AND-gates 73–75 of FIG. 2 will each be a binary 0. However, each of the Gates 73–75 will have its binary 0 output inverted to a binary 1 by their respectively associated Inverters 69–71. As shown in FIG. 2, the output of each of the Inverters 69–71 is connected to the R AND-gate of each Inverter's associated Bistable. Thus, each of the Bistables 45–47 will remain in the reset state upon the subsequent application thereto of the Clock Signal on line 41.

Since Bistable 44 is in a set state, the 0-output terminal is providing a binary 0 disabling signal to AND-gate 83. With AND-gate 83 disabled, its output I1 will also be a binary 0 applied to OR-gate 88, which is also receiving a binary 0 input ignal ARB on line 28. Thus, the output of OR-gate 88 is a binary 0, disabling AND-gate 84 which similarly has a binary 0 output I2 applied to OR-gate 89. The other input to OR-gate 89 is the binary 0 signal ARC on line 29. The output of OR-gate 89 is, therefore, a binary 0 disabling AND-gate 85, which is applying a binary 0 signal I3, to OR-gate 86, also receiving at its other input a binary 0 signal ARD on line 30. The output of OR-gate 86 is a binary 0, disabling AND-gate 82, which is, in turn, supplying a binary 0 signal I4 to Inverter 77 via line 94.

Still with reference to FIG. 2, the binary 0 signal I4 is inverted by Inverter 77 which provides at its output a binary 1 signal $\overline{I4}$ to AND-gate 72. Signal $\overline{I4}$ enables AND-gate 72 at this time, since it was assumed at the beginning of the present example that the ARA input signal on line 27 to AND-gate 72 is a binary 1. Therefore, the output of AND-gate 72 is a binary 1 signal applied to the S AND-gate of Bistable 44 in conjunction with the binary 1 Enable Service Signal on line 51. These conditions will cause Bistable 44 to remain in the set state upon the subsequent application of the Clock Signal to the S AND-gate. However, the presence of the access request signal ARA on line 27 will be honored in the following manner.

With Bistable 44 in a set state a binary 1 signal (Request A) is applied to AND-gate 58 via line 64. Bistable 54 is set due to the presence of the binary 1 Enable Service Signal on line 51 and the Clock Signal on line 41 applied to the S AND-gate of Bistable 54. The Enable Request Signal from the 1-output terminal of Bistable 54 is therefore a binary 1; thus, enabling AND-gate 58, applying a binary 1 RAG signal via line 32 to one input of AND-gate 15 (FIG. 1). The other input to AND-gate 15 is the data on line 22 from User Device 11. The RAG signal in conjunction with the data on line 22 will enable AND-gate 15 and the information on line 22 will be transferred through Gate 15 to the Common Apparatus 20 via Common Data Flow Bus 37.

As an explanation of how the Selector 10 assigns priorities and grants the User Devices access to the Common Apparatus, assume the following: Bistables 44 and 54 (FIG. 2), are each in a set state, Bistables 45–47 are each in a reset state, and the input signal ARA from the User device 11 applied to AND-gate 72 and OR-gates 87 and 50 is a binary 1. Further assume that, simultaneously, User Device 12 in FIG. 1 is requesting access to the Common Apparatus 20 by the application of a binary 1 ARB signal to AND-gate 73 and OR-gates 88 and 50. In addition, assume that User Devices 13 and 14 are each providing a binary 0 disabling signal to their respective AND-gates 74 and 75.

With these conditions established, the Enable Service Signal from OR-gate 50 is a binary 1, applied to the S and R AND-gates of each of the Bistables 44–47 and the S AND-gate of Bistable 54. The 0-output terminal of Bistable 44 is supplying a binary 0 disabling signal via line 90 to AND-gate 83. Therefore, the output signal I1 of Gate 83 is a binary 0 applied to OR-gate 88 and Inverter 78. Inverter 78 provides a binary 1 output signal $\overline{I1}$ to AND-gate 73, which in conjunction with the binary 1 ARB signal from User Device 11, will enable AND-gate 73. With AND-gate 73 in the enabled condition, its output is a binary 1 applied to the S AND-gate of Bistable 45. Referring to AND-gate 72, it is disabled by a binary 0 signal $\overline{I4}$ from Inverter 77, which is receiving a binary 1 signal I4 from AND-gate 82. The output of AND-gate 72 is, therefore, a binary 0 inverted by Inverter 68 to a binary 1 signal, which is applied to the R AND-gate of Bistable 44. Bistables 46 and 47 also receive a binary 1 signal at their respective R AND-gates from their corresponding Inverters 70 and 71. Thus, Bistable 44 is conditioned to reset (lowest priority), Bistable 25 to set (highest priority), Bistables 46 and 47 to remain reset and Bistable 54 is conditioned to remain set. Upon the application of the Clock Signal to the S and R AND-gates of each of the Bistables they will change their states accordingly.

With the resetting of Bistable 44, AND-gates 58 and 15 are disabled; thus, disabling the data transfer path from User Device 11 to the Common Apparatus 21. The setting of Bistable 45, however, will enable AND-gate 59 to honor the ARB signal by providing a binary 1 RBG signal to AND-gate 16 for the transfer of information from Used Device 12 to the Common Apparatus.

As a further explanation of the operation of the Selector 10, let it now be assumed that Bistable 45 is in a set state and Bistables 44, 46, and 47 are each in a reset state. In addition, let it be assumed that User Device 11 is applying a binary 1 access request signal ARA to AND-gate 72 of Bistable 44. User Device 14 is similarly applying an access request signal ARD to AND-gate 75 of Bistable 47 and User Devices 12 and 13 are each providing a binary 0 disabling signal to AND-gates 73 and 74 respectively. Under this condition the 0-output terminal of Bistable 45 is applying a binary 0 signal via line 91 to AND-gate 84. The output of AND-gate 84 is therefore a binary 0, which is applied as one input to OR-gate 89. Since the input signal ARC from User Device 13 is a binary 0, the output of OR-gate 89, applied to AND-gate 85, is also a binary 0. Thus, the output I3 of AND-gate 85 is a binary 0. Further, since the signal ARD is a binary 1 and Bistable 47 is in a reset state, AND-gate 82 is enabled, providing a binary 1 output signal I4. This is due to the presence at AND-gate 82 of a binary 1 signal from the O-output terminal of Bistable 47 via line 93 and a binary 1 signal from the output of OR-gate 86, the latter receiving thereto the binary 1 signal ARD on line 30. The output signal I4 of AND-gate 82 is applied to Inverter 77 via line 94, where it is inverted to a binary 0 signal $\overline{I4}$ which disables AND-gate 72. With AND-gate 72 disabled, a binary 1 signal is applied to the R AND-gate of Bistable 44 from Inverter 68, conditioning the R AND-gate to prevent Bistable 44 from setting on the next Clock Signal. The same condition exists for the R AND-gates of Bistables 45 and 46; however, since Bistable 45 is set it will reset on the next Clock Signal.

Reference is again made to the binary 0 output signal I3 from AND-gate 85, applied to Inverter 80, which in turn provides a binary 1 output signal $\overline{I3}$ to AND-gate 75. AND-gate 75 thus is enabled since the ARD signal applied to Gate 75 is also a binary 1. With these conditions established, the application of the next Clock Signal to Bistables 44–47, Bistable 47 will assume a set state and simultaneously Bistable 45 will achieve a reset state, while Bistables 44 and 46 will remain in the reset state.

Upon achieving the set state, Bistable 47 assumes the position of highest priority with respect to Bistable 44 which is also receiving an access request at the same time as Bistable 47. Thus, the Bistable receiving an access request and achieving the position of highest priority (Bistable 47) is the Bistable nearest to the last Bistable (Bistable 45) which is in a set state and located in the direction of signal propagation through the logic elements forming a loop for the flow of the signal within the Selector 10. The Bistable which is in a set state will assume the status of lowest priority with respect to all other Bistables when the next Clock Signal occurs, provided at least one of the other Bisables receives an access request prior to the occurrence of the Clock Signal.

From the previous explanation, it can be seen that the honoring of requests and the assignment of priorities by the Selector 10 is done in a non-sequential manner inasmuch as the input to Bistable 46 did not have to be sampled prior to Bistable 47 in order to determine which User Device was requesting access; i.e., the input to each of the Bistables 44–47 is sampled simultaneously.

Considering further the operation of the Selector, assume that Bistable 44 is in a set state, indicating that it is honoring an access request from its associated User Device 11 (ARA is a binary 1). Further assume that during the time interval between the occurrence of the Clock Signal which set Bistable 44 and the next succeeding Clock, each of the AND-gates 73–75 receive a corresponding one of the ARB–ARD signals representative of a binary 1. Under this condition of operation, since Bistable 44 is in a set state, a binary 0 signal is present on line 90, thus disabling AND-gate 83. This in turn applies a binary 0 input to Inverter 78, which supplies a binary 1 signal $\overline{I1}$ to AND-gate 73. Since $\overline{I1}$ and ARB are both binary 1's, AND-gate 73 is enabled. This allows Bistable 45 to be placed in the set state upon the occurrence of a subsequent Clock Signal on line 41. OR-gate 88 is receiving a binary 1 signal ARB on line 28 which propagates through OR-gate 88, applying a binary 1 signal to AND-gate 84. Since Bistable 45 is in a reset state at this time, it is supplying, on line 91, a binary 1 input signal to AND-gate 84, thus enabling AND-gate 84. The output of AND-gate 84, a binary 1, is inverted by Inverter 79 which applies a binary 0 inhibit signal $\overline{I2}$ to AND-gate 74, thus disabling Gate 74. The output of Gate 74 is inverted through Inverter 70, which applies a binary 1 signal to the R AND-gate of Bistable 46, so that upon the subsequent occurrence of the Clock Signal on line 41 the Bistable will remain in the reset condition.

AND-gate 75 functions in the same maner as AND-gate 74, keeping Bistable 47 in a reset state upon application of the Clock Signal to the R AND-gate of Bistable 47. Bistable 44 will reset on the same Clock Signal in the same manner as previously described, thus taking on the position of lowest priority.

With the conditions just established, Bistable 45 has highest priority and when the Clock Signal is applied to its S AND-gate, it will achieve a set state, thus honoring its access request from its associated User Device 12.

Upon the setting of Bistable 45 the binary 1 Request B signal on line 65 will enable AND-gate 59, since Bistable 54 is in the set state, due to the application thereto of an access request signal from one of the User Devices via OR-gate 50. The enabling of AND-gate 59 applies a binary 1 signal RBG (Request B Granted) to Data Access Gate 16 (FIG. 1). The RBG signal enables Gate 16 for the transfer of data from User Device 12 on line 23 (FIG. 1), to the Common Apparatus 20 via Common Data Flow Bus 37.

With Bistable 45 now in the set state, upon application of the next Clock Signal on line 41 to Bistables 44–47, Bistable 45 will reset and achieve the position of lowest priority with respect to the other Bistables. Bistable 46, since it is receiving a binary 1 ARC signal, will set assuming the highest priority with respect to the other Bistables. This is explained by considering the condition of Bistable 45 in FIG. 2 with respect to the other Bistables while simultaneously considering the ARA–ARD signal inputs on lines 27–30, respectively. Bistable 45 is in the set state, therefore, its 0-output on line 91 will be a binary 0, disabling AND-gate 84. With AND-gate 84 disabled, a binary 0-output signal I2 is applied to OR-gate 89 and Inverter 79. Inverter 79 is providing a binary 1 output $\overline{I2}$ to AND-gate 74. With the presence of $\overline{I2}$ at the input of AND-gate 74, and since signal ARC on line 29 is a binary 1, AND-gate 74 is enabled, establishing Bistable 46 as having the highest priority with respect to all other Bistables at the next Clock Signal. Since Bistable 46 is in a reset state, a binary 1 signal from its 0-output terminal is applied to the input of AND-gate 85 via line 92. AND-gate 85 is also receiving a binary 1 ARC signal via OR-gate 89; thus, AND-gate 85 is enabled providing a binary 1 output to OR-gate 86, which in turn passes the binary 1 signal to AND-gate 82. Since Bistable 47 is similarly in a reset condition, its 0-output on line 93 enables AND-gate 82 to provide a binary 1 output signal I4 which is applied to Inverter 77. Inverter 77 provides an $\overline{I4}$ output signal (binary 0) which is applied to AND-gate 72, disabling AND-gate 72 and preventing Bistable 44 from achieving a set state upon the application thereto of a subsequent Clock Signal on line 41. The binary 1 signal I4 is also applied to OR-gate 87, providing a binary 1 signal therethrough to one input of AND-gate 83. The second input to AND-gate 83 is a binary 1 signal from Bistable 44 on line 90 since, at this time, Bistable 44 is in a reset state. Therefore, with the two binary 1 inputs to AND-gate 83, its output I1 is a binary 1, applied to Inverter 78, where it is inverted to provide a binary 0 output signal I1 to disable AND-gate 73. With AND-gate 73 disabled, its output is a binary 0 inverted by Inverter 69 to a binary 1, which in turn is applied to the R AND-gate of Bistable 45. This will condition Bistable 45 to achieve a reset state on the next Clock Signal and prevent Bistable 45 from setting again until at least one of the other Bistables within the Selector has had an opportunity to honor an access request.

To further portray now the present invention randomly honors access requests from the User Devices and assigns priorities in response to the requests, assume that Bistable 45 is in a set state, indicating that it is honoring the ARB signal (binary 1) applied to AND-gate 73 from User Device 12. Also assume that between the time of the occurrence of the Clock Signal, which placed Bistable 45 in a set state, and the occurrence of the next Clock Signal the following takes place: (1) Bistable 44 receives a binary 1 ARA signal from User Device 11, at AND-gate 72; (2) subsequent to the occurrence of the ARA signal a binary 1 ARD signal appears at AND-gate 75 from User Device 14; (3) the ARC signal applied to AND-gate 74 is a binary 0 (no access request). Under this condition, Bistable 47 will honor its access request first over Bistable 44, since Bistable 47 is next highest in line in the assignment and granting of priority access requests to the User Devices. The manner in which this is accomplished is explained as follows: With Bistable 45 in a set state, its 0-output terminal supplies a binary 0 signal to AND-gate 84. AND-gate 84 is disabled applying a binary 0 signal to OR-gate 89. Since the ARC signal on line 28 is also a binary 0, the output of OR-gate 89 supplies a binary 0 signal to one input of AND-gate 85. This will cause AND-gate 85 to be disabled, supplying a binary 0 signal I3 to OR-gate 86 and Inverter 80. Inverter 80 provides a binary 1 signal to enable AND-gate 75 in conjunction with the ARD signal to condition Bistable 47 to set on the next Clock Signal. The ARD signal is also applied to OR-gate 86, which provides a binary 1 signal as one input to AND-gate 82. The other input to AND-gate 82 on line 93 is also a binary 1, since Bistable 47 is in a reset state. These two binary 1 input signals cause AND-gate 82 to be enabled, providing a binary 1 output signal I4 on line 94 to Inverter 77. Inverter 77 provides a binary 0 disabling signal $\overline{I4}$ to AND-gate 72, whose output becomes a binary 0. The output of Gate 72 is applied to Inverter 68 for application of a binary 1 to the R AND-gate of Bistable 44. This inhibits Bistable 44 from achieving a set state upon the occurrence of the next Clock Signal on line 41.

In summary, prior to the Clock Signal which set Bistable 47, it was the next Bistable in line in the direction of signal propagation around the loop which was receiving an access request and it was the Bistable nearest to the Bistable which was in a set state (Bistable 45). Bistable 47 honored its access request first, achieving a position of highest priority even though the access request signal ARA to Bistable 44 occurred first during the time interval between Clock Signals. When Bistable 47 achieved the set state, Bistable 44 assumed the position of highest priority with respect to all of the other Bistables; i.e., assuming that its access request input ARA is a binary 1 before the occurrence of the next Clock Signal following the Clock which set Bistable 47. If the ARA signal is a binary 1, Bistable 44 will set and Bistable 47 will achieve a reset state upon the application of the next Clock Signal. If Bistable 44 sets, Bistable 47 will achieve the status of lowest priority with respect to all other Bistables, provided at least one of the Bistables other than Bistable 44 receives an access request before the occurrence of the Clock Signal which caused Bistable 44 to set.

As briefly discussed in the previous description there is shown in FIG. 2 a plurality of AND-gates 58–61. Each of these AND-gates is capable of generating an output request granted signal. RAG–RDG respectively, in response to the honoring of an access request by the associated Bistables 44–47. Each of the AND gates 58–61 receives, as a first input, an Enable Request Signal via line 56 from the 1-output terminal of Selection Control Bistable 54. OR-gate 50 generates a binary 1 Enable Service Signal in response to any binary 1 access request from User Devices 11–14. The binary 1 output of OR-gate 50 applied to the S AND-gate of Bistable 54 in conjunction with the Clock Signal on line 41 will set Bistable 54. Immediately subsequent to setting, Bistable 54 will supply a binary 1 signal on line 56 to each of the AND-gates 58–61. Applied as a second input to each of the AND-gates 58–61, is an associated one of the signals Request A-Request D from the 1-output terminal of Bistables 44–47 via lines 64–67. When any one of the Bistables 44–47 is in a set state, its 1-output terminal will apply a binary 1 request signal to its corresponding AND-gate. The request signal from the Bistable in conjunction with the Enable Request Signal from Bistable 54 will enable the associated AND-gate, which in turn provides a binary 1 request granted output signal to a corresponding one of the data Access Gates (15–18), as shown by FIG. 1.

Only one of the Bistables 44–47 (FIG. 2), will be in a set state at any given time and a Bistable will remain set for only one Clock Period, provided at least one other Bistable receives an access request from its associated User Device between two consecutive Clock Signals. Thus, only one of the AND-gates 58–61 will be enabled at any given time, and it will be enabled only when Bistable 54 is set and only as long as its associated Bistable is in a set state.

With suitable control of the Clock Signal applied to Bistables 44–47, the length of time that a Bistable will remain in a set state can be controlled by how often the Clock Signal is applied to the Bistable. In this manner, the length of time that the AND-gates 58–61 and 15–18 are enabled can be varied in accordance with the requirements of the data transfer rate of the User Devices 11–14.

While the principles of the invention have now been made clear in an illustrative embodiment, there will be immediately obvious to those skilled in the art many modifications of structure, arrangement, proportions, the elements, materials, and components used in the practice of the invention, and otherwise which are particularly adapted for specific environments and operating requirements without departing from those principles. The appended claims are therefore intended to cover and embrace any such modifications within the limits only of the true spirit and scope of the invention.

What is claimed is:

1. A data transfer system comprising: a common apparatus; a plurality of equipment units each capable of generating an access request signal representative of a need for transferring information signals from said equipment units to said common apparatus; a selector means intermediate said equipment units and said common apparatus for selectively honoring the presence of said access request signals from said equipment units to control the transfer of information signals from said equipment units to said common apparatus, said selector means comprising, a plurality of storage cells equal in number at least to the number of equipment units, each of said storage cells capable of assuming either of first and second states, each of said storage cells capable of generating a granted signal representative of the honoring of a one of said access request signals, and control means associated with each of said storage cells for providing inhibit signals and further including means providing control signals to said storage cells for varying the states thereof; means interconnecting said storage cells and said control means in a closed loop configuration, whereby said inhibit signals are energized successively in said loop in accordance with the states of said storage cells; connecting means for applying said access request signals from said equipment units to said control means, said control means responsive to said access request signals whereby the access request signals may propagate through said interconnecting means to vary the states of said storage cells in accordance with the states of said cells; and a data transfer means for receiving said information signals from said equipment units and transferring the information signals to said common apparatus in response to said granted signals selectively applied to said data transfer means from said storage cells.

2. A data transfer system for selectively transferring data signals from a plurality of equipment units to a common apparatus, each of said equipment units being capable of generating an access request signal representative of a need for transferring data to said common apparatus, the combination comprising: a data transfer means intermediate said common apparatus and said equipment units for transferring the data signals from selected ones of said equipment units to said common apparatus; connecting means for applying said data signals from said equipment units to said data transfer means; and selector means for selectively providing output granted signals to said data transfer means in response to said access request signals from said equipment units for selecting individual ones of said equipment units for the transfer of data signals through said data transfer means to said common apparatus· said selector means comprising, a plurality of storage cells equal in number at least to the number of equipment units, each of said storage cells capable of assuming either of first and second states, and each cell capable of generating a one of said output granted signals, a plurality of control means each associated with a one of said storage cells and a corresponding one of said equipment units, each control means capable of receiving an access request signal from an associated equipment unit, each of said control means capable of generating an output inhibit signal and providing control signals to corresponding ones of said storage cells to vary the states of said cells, said control means and each control means associated storage cell being successively interconnected to the immediately succeeding control means to form a closed loop configuration, whereby said access request signals applied to said control means from said equipment units may propagate through said control means, said request signals and said inhibit signals being combined in said control means to selectively provide control signals to said storage cells to vary the states of said cells, such that· only one of the storage cells will at any one time provide a one of said output granted signals to said data transfer means to enable the data transfer means to transfer said data signals to said common apparatus from the equipment unit selected by said output granted signal.

3. A data transfer system comprising: a common apparatus; a plurality of equipment units, each capable of generating a request signal representative of a need for the transfer of data signals from said equipment units to said common apparatus; a data transfer means intermediate said equipment units and said common apparatus for transferring said data signals from said equipment units to said common apparatus; a priority selector means for selectively honoring said request signals applied to said selector from said equipment units and generating output request granted signals in response to the honoring of said request signals, said priority selector comprising, a plurality of storage cells equal in number at least to the number of said equipment units, each cell being capable of assuming either of first and second states and each cell capable of generating a one of said output request granted signals, a plurality of control means equal in number to the number of storage cells, each of said control means associated with a one of said equipment units and with a corresponding one of said storage cells, said control means each capable of generating an output inhibit signal and providing control signals to associated ones of said storage cells to vary the states of said cells, first interconnecting means between each control means for interconnecting the output inhibit signal of each control means to the immediately succeeding control means, second interconnecting means between each control means associated storage cell and the immediately succeeding control means for interconnecting each storage cell to the immediately succeeding control means for providing signals to said control means to control the generation of said inhibit signals; first connecting means associated with each of said control means for applying a one of said access request signals from said equipment units to individual ones of said control means; second connecting means associated with each control means for applying the request signal applied to each control means by said first connecting means to the control means immediately successive to each control means, whereby the request signal applied to each control means may propagate through said first interconnecting means to the immediately successive control means to generate a one of said inhibit signals from the immediately successive control means when the storage cell associated with the immediately preceding control means is in the second state, said inhibit signals controlling said control means, such that, the control signals applied to said storage cells from said control means may vary the states of only two of said storage cells at a time in a predetermined manner dependent upon the states of said storage cells and dependent upon the order of the occurrence of said access request signals applied to said control means from said equipment units; and means for applying said output request granted signals from said storage cells to said data transfer means for selectively enabling the transfer of data signals from individual ones of said equipment units to said common apparatus in accordance with the states of said storage cells.

4. A data transfer system for selectively granting individual ones of a plurality of equipment units priority access to a common apparatus in response to randomly occurring access request signals generated by said equipment units, the combination comprising: a priority selector intermediate said equipment units and said common apparatus for dynamically assigning priorities to said equipment units by honoring said access request signals applied to said selector from said equipment units and developing output granted signals in response to the honoring of said access request signals for selectively controlling the transfer of information from said equipment units to said common apparatus, said priority selector comprising, a plurality of priority flip flops equal in number at least to the number of equipment units for honoring said access request signals from said equipment units, each of said flip flops capable of assuming either of first and second states, said flip flops each associated with a one of said equipment units and a one of said flip flops always being in a state representative of its honoring an access request signal from its associated equipment unit, a plurality of control means each associated with a corresponding one of said equipment units and a corresponding one of said flip flops for providing signals to said flip flops to vary the states of said flip flops, said control means and each control means associated flip flop being interconnected to the immediately succeeding control means to form a closed loop configuration whereby inhibit signals, generated by said control means, may be energized successively in said loop in a manner controlled by the states of said flip flops; interrogation means for applying a clock signal to said control means to control the time of varying the states of said flip flops; connecting means for applying said access request signals from said equipment units to each equipment unit's associated control means and to the immediately succeeding control means, whereby said access request signals may propagate through said loop, said control means being responsive to said access request signals and said inhibit signals to vary the states of said flip flops, such that, a first flip flop which is in a first state will achieve a second state and a second flip flop which is in a second state will achieve a first state when said clock signal is applied to said control means, said second flip flop being the next flip flop in said loop successive to said first flip flop which is receiving an access request signal at its associated control means at the time of the occurrence of said clock signal; and a plurality of data access means equal in number to the number of equipment units, each of said data access means associated with a one of said equipment units and a one of said flip flops, and each data access means capable of being selectively enabled by a one of said granted signals to transfer information to said common apparatus from each data access means' associated equipment unit.

5. In a data transfer system for selectively granting a plurality of equipment units access to a common apparatus, the improvement comprising: a data transfer means intermediate said common apparatus and said equipment units for transferring data signals from said equipment units to said common apparatus; selector means for selectively honoring the presence of access request signals supplied to said selector from said equipment units by providing request granted signals to said data transfer means to selectively control the transfer of said data signals from said equipment units to said common apparatus, said selector comprising, a plurality of bistables equal in number at least to the number of equipment units, each of said bistables capable of assuming either of first and second states, said bistables each capable of generating a one of said request granted signals, a plurality of control means equal in number to the number of said bistables, each of said control means capable of generating an inhibit signal, means connecting each of said control means to an associated one of said bistables for providing signals to said bistables to vary the states thereof, first connecting means associated with each of said control means for applying said access requst signals to said control means from individual ones of said equipment units, second connecting means associated with each of said control means for applying the access request signal applied to each control means to the immediately succeeding control means to form a closed loop configuration whereby said access request signals may propagate through said loop, first interconnecting means successively interconnecting each control means to the immediately succeeding control means whereby said inhibit signals may be energized successively in said loop, second interconnecting means successively interconnecting each control means' associated bistable to the immediately succeeding control means for providing signals to said control means for controlling the propagation of said access request signals through said loop; and interrogation signal generating means for applying a recurring clock signal to said control means, said clock signal interrogating for the presence and absence of said access request signals applied to said control means and controlling the time interval between the varying of the states of said bistables, whereby each equipment unit which is providing an access request signal to said control means is granted access to said common apparatus for a discrete time interval of a series of recurrent time intervals representative of the time interval between any two consecutively recurring clock signals.

6. A data transfer system of the type wherein data signals are transferred from a plurality of equipment units to a common apparatus under control of a selector responsive to access request signals provided to the selector from the equipment units, the improvement comprising: a priority selector device, said selector device comprising; a plurality of priority storage cells equal in number at least to the number of equipment units, each of said cells having a set AND-gate, a reset AND-gate and first and second output terminals, said storage cells each capable of assuming either of first and second states, each cell capable of generating an output request signal and a control signal, one of said storage cells having a trigger set terminal and all other cells having a trigger reset terminal; means to apply an initialization signal to said trigger set and reset terminals of said cells to establish an initial priority pattern for said storage cells; a selection control storage cell having a set AND-gate and a reset AND-gate, said control cell capable of assuming either of first and second states and providing an output enable request signal; enable service means responsive to said access request signals from said equipment units for providing an enable service signal to said set and reset AND-gates of said priority storage cells and said control storage cell; means to apply a clock signal to said set and reset AND-gates of said control storage cell and said priority storage cells to control the time of varying the states of said cells; and control means associated with each of said priority storage cells for providing signals to said set and reset AND-gates of said priority storage cells for varying the states of said priority cells, each of said control means capable of generating an inhibit signal and receiving a one of said access request signals from an associated one of said equipment units, said control means and the control signal from each control means' associated priority storage cell being interconnected to the immediately succeeding control means to form a closed loop configuration, whereby the access request signal applied to each control means may propagate through said loop under control of said control signals, and each control means providing signals to associated ones of said storage cells to vary the states of said cells in response to the combining in each control means of said access request signals, said inhibit signal and said control signal, such that, a one of said storage cells in a first state will assume a second state, another one of said cells in a second state will achieve a first state and all other storage cells will remain in their present state, when said enable service signal and said clock signal are applied to said set and reset AND-gates of said storage cells, said storage cell assuming said first state generating an output request signal.

7. A priority access request selector, comprising: a plurality of priority bistables, each having first and second output terminals, each bistable capable of assuming either of first and second states and each capable of providing a request output signal from said first output terminal when said bistable is in said first states; control means associated with each of said bistables for applying control signals thereto for varying the states of said bistables, each of said control means capable of receiving an access request signal from a corresponding one of several requesting user devices, said control means each capable of generating an output inhibit signal, said control means and said second output terminal of each control means' associated bistable interconnected to the immediately succeeding control means to form a closed loop configuration, whereby said access request signals may propagate through said loop in accordance with the states of said bistables to control the states of said bistables; enable service means capable of receiving each of said access request signals from said used devices and providing an enable service signal to each of said control means to enable the control signals applied to said bistables from said control means to vary the states of said bistables when one or more of said access request signals is applied to said enable service means and to said control means; a selection control bistable capable of receiving said enable service signal from said enable service means, said control bistable capable of assuming either of first and second states and providing an output enable request signal in response to said enable service signal; means for applying a clock signal to said control means and said control bistable to control the time of varying the states of said priority bistables and said control bistable; and a plurality of AND-gates each capable of receiving said enable request signal from said selection control bistable, each of said AND-gates associated with a one of said priority bistables and each AND-gate capable of providing a request granted output signal in response to said request output signal from said first terminal of each AND-gates' associated priority bistable when said control bistable is in said first state.

8. In a priority access request selector as recited in claim 7 wherein each of said immediately succeeding control means comprises: an OR-gate for receiving one of said access request signals and one of said inhibit signals; a first AND-gate for receiving a signal from said OR-gate and a signal from said second output terminal of one of said bistables, said first AND-gate generating one of said output inhibit signals; a first inverter for inverting said inhibit signal from said first AND-gate; a second AND-gate for receiving a signal from said first inverter and one of said access request signals from an associated equipment unit; a second inverter for inverting a signal from said second AND-gate; a set AND-gate for applying a set signal to the bistable associated with said control means to place said bistable in said first state, said set AND-gate receiving said clock signal, a signal from said second AND-gate, and said enable service signal from said enable service means; and a reset AND-gate for applying a reset signal to the bistable associated with said control means to place said bistable in said second state, said reset AND-gate receiving said clock signal, said enable service signal from said enable service means and a signal from said second inverter.

9. A data transfer system for use in on-line data communication systems for selectively transferring information signals from a plurality of equipment units to a common apparatus by granting said equipment units access to said common apparatus in response to randomly occurring access signals generated by said equipment units, the combination comprising: a priority selector for dynamically assigning priorities to said equipment units by honoring said access signals applied to said selector from said equipment units and selectively developing output request signals in response to said access signals for controlling the transfer of said information signals to said common apparatus, said priority selector comprising, a plurality of priority bistables, each having first and second output terminals, each bistable capable of assuming either of first and second states and each providing a request output signal from said first output terminal when said bistable is in said first state, control means associated with each of said bistables for applying signals to said bistables for varying the states of said bistables, each of said control means capable of receiving an access signal from one of said equipment units, said control means each capable of generating an output inhibit signal, said control means and said second output terminal of each control means' associated bistable being interconnected to the immediately succeeding control means to form a closed loop configuration, whereby said access signals may propagate through said loop to control the varying of the states of said bistables, enable service means capable of receiving each of said access signals from said equipment units and providing an enable service signal to each of said control means to enable the signals applied to said bistables from said control means to vary the states of said bistables when at least one of said access signals is applied to said enable service means, a selection control bistable capable of receiving said enable service signal from said enable service means, said control bistable capable of assuming either of first and second states and generating an output enable signal in response to said enable service signal, means for applying a clock signal to each of said control means and said control bistable to control the time of varying the states of said priority bistables and said control bistable; and data transfer means for selectively transferring said information signals to said common apparatus from individual ones of said equipment units in response to said output enable signal from said selection control bistable, and individual ones of said output request signals from said priority bistables.

10. In a data transfer system as recited in claim 9 wherein said data transfer means comprises: a first plurality of AND-gates, each associated with a one of said priority bistables, said first AND-gates each providing an output request granted signal in response to said output enable signal from said selection control bistable and to an output request signal applied to each of said AND-gates from an associated one of said priority bistables; and a second plurality of AND-gates equal in number at least to the number of said first AND-gates, at least one of said second AND-gates associated with a corresponding one of said first AND-gates and a corresponding one of said equipment units, said second AND-gates each transferring said information signals to said common apparatus from each of said second AND-gate's corresponding equipment unit when said second AND-gates are selectively enabled by said request granted signals applied to said second AND-gates from associated ones of said first AND-gates.

References Cited

UNITED STATES PATENTS

| | | | |
|---|---|---|---|
| 3,345,574 | 10/1967 | Hilberg | 307—223X |
| 3,353,160 | 11/1967 | Lindquist | 340—172.5 |
| 3,384,761 | 5/1968 | Olson et al. | 307—223X |
| 3,395,394 | 7/1968 | Cottrell, Jr. | 340—172.5 |
| 3,399,384 | 8/1968 | Crockett et al. | 340—172.5 |
| 3,449,722 | 6/1969 | Tucker | 340—172.5 |

PAUL J. HENON, Primary Examiner

H. E. SPRINGBORN, Assistant Examiner